(12) United States Patent
Nozaki

(10) Patent No.: US 6,401,394 B2  
(45) Date of Patent: Jun. 11, 2002

(54) MOUNTING STRUCTURE OF VEHICLE DOOR WINDOW GLASS INNER WEATHERSTRIP

(75) Inventor: Masahiro Nozaki, Nishikasugai-gun (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/793,125

(22) Filed: Feb. 27, 2001

(30) Foreign Application Priority Data

Mar. 23, 2000 (JP) ........................................ 2000-082128

(51) Int. Cl.[7] ................................................. B60J 1/16
(52) U.S. Cl. ............................................................. 49/377
(58) Field of Search .......................... 49/374, 377, 440, 49/441, 484.1, 495.1

(56) References Cited

U.S. PATENT DOCUMENTS

| | | | |
|---|---|---|---|
| 3,742,649 A | * 7/1973 | Dochnahl | 49/441 |
| 4,894,954 A | 1/1990 | Nozaki et al. | 49/479 |
| 5,388,371 A | 2/1995 | Nozaki | 49/377 |
| 5,433,038 A | * 7/1995 | Dupuy | 49/377 |
| 5,775,030 A | 7/1998 | Hamabata | 49/377 |
| 5,799,442 A | 9/1998 | Takahashi et al. | 49/377 |
| 6,128,859 A | * 10/2000 | Vance | 49/377 |

FOREIGN PATENT DOCUMENTS

JP 403045422 * 2/1991 ................. 49/377

* cited by examiner

Primary Examiner—Jerry Redman  
(74) Attorney, Agent, or Firm—Pillsbury Winthrop LLP

(57) ABSTRACT

A cutout is provided in an upper edge of a door inner panel at a rear end portion thereof, and a clip member is provided on a door window glass inner weatherstrip which is mounted along the upper edge and is brought into abutment against front and rear vertical portions of a glass run at front and rear terminal ends thereof at such a position that corresponds to the cutout when the rear terminal end of the door window glass inner weatherstrip is brought into abutment against the glass run. The clip member is then brought into engagement with the cutout to position the door window glass inner weatherstrip for mounting, whereby no gap is formed at a portion where the rear terminal end and the glass run attach to each other.

8 Claims, 4 Drawing Sheets

MOUNTING STRUCTURE OF VEHICLE DOOR WINDOW GLASS INNER WEATHERSTRIP

BACKGROUND OF THE INVENTION

1. Field of the Invention

The present invention relates to a mounting structure of a door window glass weatherstrip provided along a belt line of a vehicle door, and more particularly of a door window glass inner weatherstrip.

The present application is based on Japanese Patent Application No. 2000-82128, which is incorporated herein by reference.

2. Description of the Related Art

As shown in FIG. 3, a glass run 4 is mounted along an inner circumference of a window frame 3 of a vehicle door 1, and a door window glass weatherstrip 5 is mounted along a door belt line 20, whereby a seal is provided between a window opening in the door 1 and a door window glass 9.

The door window glass weatherstrip 5 comprises a door glass inner weatherstrip mounted along an upper edge of a door inner panel of a door main body and a door glass outer weatherstrip mounted along an upper edge of a door outer panel, and the door window glass 9 is designed to be resiliently held from inner and outer surfaces thereof by seal lips extending from confronting side surfaces of the two weatherstrips therebetween.

As shown in FIGS. 3 and 4 (only a rear end portion of a door window glass inner weatherstrip 5A is shown), the door window glass inner weatherstrip 5A comprises a mounting base portion 51 and upper and lower seal lips 52, 53. Note, however, that there exists a case where only a single seal lip is provided. The glass run 4 comprises seal lips 41, 42 for holding a circumferential portion of the door window glass 9 from inner and outer surfaces thereof. Then, the inner weatherstrip 5A is mounted in such a manner that front and rear terminal ends thereof attach to front and rear vertical portions 4A, 4B of the glass run 4. In FIG. 4, reference numerical 2A denotes a door inner panel and reference numeral 21 denotes a door interior trim.

However, the door window glass weatherstrip 5 is cut slightly shorter than a longitudinal space between the front and rear vertical portions of the glass run 4 in consideration of scattering or variation of the length of the longitudinal space and workability in mounting the same within the space. This inevitably produces gaps at the front and rear end portions of the inner weatherstrip 5A to which the vertical portions of the glass run 4 are attached.

On the other hand, while the vehicle is running, tire noise and other exterior noise enter into a space formed in the door main body 2 from a drainage hole formed in a lower end of the door main body, gaps at a movable portion of an outside door handle and the like. The noise further enters into the passenger compartment of the vehicle from the gaps formed at the front and rear end portions of the inner weatherstrip 5A, causing interior noise.

SUMMARY OF THE INVENTION

The present invention was made with a view to preventing the penetration of noise into the passenger compartment which is inconsonant to the ears of occupants of the vehicle.

According to a first aspect of the invention, there is provided a mounting structure of a vehicle door window glass inner weatherstrip adapted to be mounted on a door inner panel along an upper edge thereof, the door window glass inner weatherstrip comprising a mounting base portion and seal lips which resiliently contact an inner surface of a door window glass being mounted in such a manner as to be attached at front and rear terminal ends thereof to front and rear vertical portions of a glass run mounted along an inner circumference of a door window frame, respectively, the mounting structure being characterized in that a positioning means is provided in the door window glass inner weatherstrip and the upper edge of the door inner panel the constituent components of which positioning means are brought into engagement with each other at such a position that the rear terminal end of the window glass inner weatherstrip is allowed to be brought into abutment with the rear vertical portion of the glass run.

The first aspect of the invention was contrived in consideration of the fact that noise mainly penetrating into the passenger compartment from the gap at the rear end of the door window glass inner weatherstrip which is close to the ear of the occupant becomes inconsonant to the ear of the occupant, and the rear terminal end of the door window glass inner weatherstrip and the glass run are brought into abutment with each other with no gap being produced therebetween by mounting the door window glass inner weatherstrip using the positioning means as a positional reference.

Additionally, according to a second aspect of the invention, there is provided a mounting structure of a vehicle door window glass inner weatherstrip adapted to be mounted on a door inner panel along an upper edge thereof, the door window glass inner weatherstrip comprising a mounting base portion and seal lips which resiliently contact an inner surface of a door window glass being mounted in such a manner as to be attached at front and rear terminal ends thereof to front and rear vertical portions of a glass run mounted along an inner circumference of a door window frame, respectively, the mounting structure being characterized in that the mounting base portion is formed so as to extend and contract by constructing a core member embedded in the mounting base portion extendable and contractible or separable, that a first positioning means is provided in the door window glass inner weatherstrip and the upper edge of the door inner panel at front ends thereof, respectively, the constituent components of which first positioning means are brought into engagement with each other at such a position that the front terminal end of the door window glass inner weatherstrip is brought into abutment with the front vertical portion of the glass run, and that a second positioning means is provided in the door window glass inner weatherstrip and the upper edge of the door inner panel at rear ends thereof, respectively, the constituent components of the second positioning means are brought into engagement with each other at such a position that the rear terminal end of the door window glass inner weatherstrip is brought into abutment with the rear vertical portion of the glass run.

According to the second aspect of the invention, the front and rear terminal ends of the door window glass inner weatherstrip come to abutment with the front and rear vertical portions of the glass run with no gap being produced therebetween by bringing the constituent components of the respective two positioning means into engagement with each other, whereby the penetration of exterior noise into the passenger compartment through the space of the door main body is prevented. In this case, a gap between the longitudinal space between the vertical portions of the glass run and the length of the door window glass inner weatherstrip is adjusted by allowing the mounting base portion of the door window glass inner weatherstrip to extend together with the core member.

Further, according to the third aspect of the invention, a mounting structure of a vehicle door window glass inner weatherstrip as described above, the positioning means comprises further a positioning projection provided on the door window glass inner weatherstrip at a predetermined distance away from the rear terminal end of the door window glass inner weatherstrip, a noise insulating lip integrally formed on the glass run, wherein the positioning projection and the noise insulating lip are brought into abutment with each other.

Furthermore, according to the fourth aspect of the invention, a mounting structure of a vehicle door window glass inner weatherstrip as described above, wherein the rear terminal end of the door window glass inner weatherstrip has a surface matching to exterior shape of the glass run, allowing the door window glass inner weatherstrip to be brought into abutment with the glass run without forming gap.

DETAIL DESCRIPTION OF THE PREFERRED EMBODIMENTS

Figure 1A:
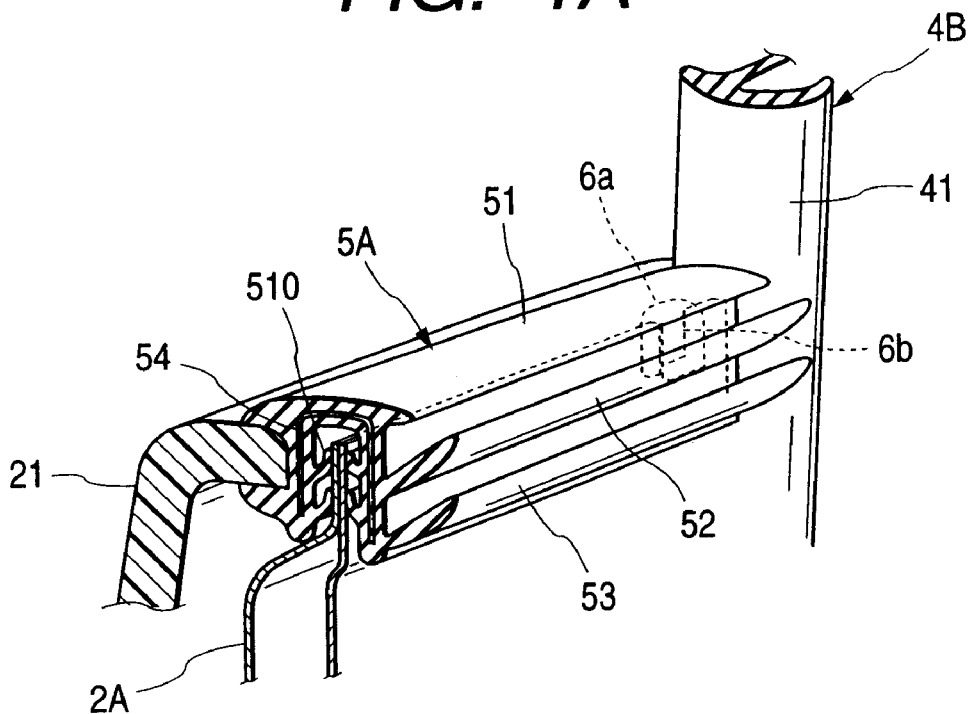
FIG. 1A is a perspective view of a rear portion of a door window glass inner weatherstrip of a first embodiment of the present invention.

A first embodiment of the invention will be described, referring mainly to a rear end portion of a door window glass inner weatherstrip 5A shown in FIG. 1.

The inner weatherstrip 5A is a rubber extrusion and has a cross section of substantially a U-shape. The inner weatherstrip 5A comprises a mounting base portion 51 having retaining lips 510 projecting from confronting interior surfaces thereof and upper and lower seal lips 52, 53 both extending diagonally upwardly from one of side walls of the mounting base portion 51. A core member of sheet metal 54 having substantially the same cross-sectional shape as the mounting base portion 51 is embedded in the mounting base portion 51. The inner weatherstrip 5A is mounted on a door inner panel 2A by allowing an upper edge of the door inner panel 2A to be forced into between the retaining lips 510. Further an upper edge of a door interior trim 21 is securely fitted in a groove formed on an outside of the other side wall of the mounting base portion 51.

Figure 3:
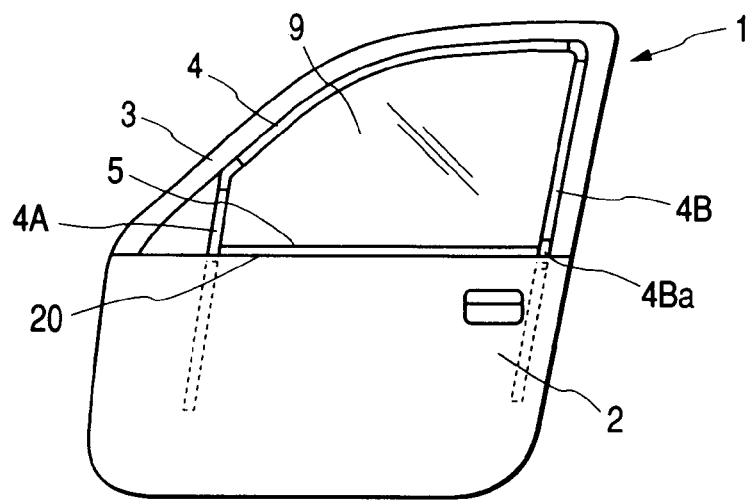
FIG. 3 is a front view of a vehicle door.

Rear terminal ends of the seal lips 52, 53 of the inner weatherstrip 5A are cut into a curved configuration matching the external surface configuration of an inner seal lip 41 of a rear vertical portion 4B of the glass run 4 which confronts the seal lip rear terminal ends. Note that front terminal ends of the seal lips 52, 53 confront a front vertical portion 4A of the glass run 4, similarly. Then, a door window glass 9 (see FIG. 3) is held between the inner seal lips 41 and outer seal lips 42 (see FIG. 4) of the glass run 4 at longitudinal front and rear ends thereof, and is allowed to be lifted up and down with the leading edges of the seal lips 52, 53 of the inner weatherstrip 5A being in resilient contact with an inner surface of the window glass 9.

A longitudinally U-shaped cutout 6b is provided in the upper edge of the door inner panel 2A at a front-more position which is a predetermined distance (for example, 15 mm) away from a rear terminal end thereof. On the other hand, a clip member 6a is mounted at a rear end portion of the inner weatherstrip 5A for engagement with the aforesaid cutout 6b.

Figure 1B:
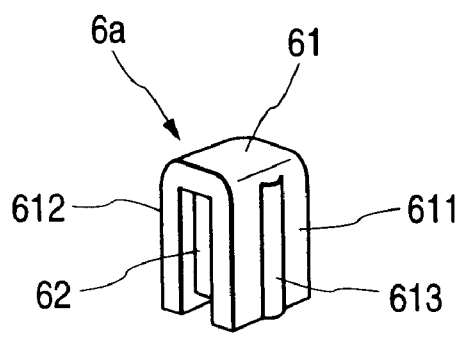
FIG. 1B a perspective view of a positioning means (clip member) that is to be provided in the same inner weatherstrip.

The clip member 6a, which is intended to constitute a positioning means together with the cutout 6b, is a molded unit of a synthetic resin and comprises integrally, as shown in FIG. 1B, a frame portion 61 of a U-shaped cross section which corresponds to an inner circumferential surface of the mounting base portion 51 of the inner weatherstrip 5A and a plate-like partition wall 62 which partitions the inside of the frame portion 61 longitudinally. Vertically elongated projections 613 (only one of them is shown in the figure) are formed on external surfaces of side walls 611, 612 on both sides of the frame portion 61. The thickness of the partition wall 62 is such that the partition wall 62 fits in the cutout 6b.

The clip member 6a is mounted in the inner weather strip by upwardly forcing the retaining lips 510 so that the lips collapse into the mounting base portion 51 of the inner weatherstrip 5A. As this occurs, the elongated projections 613 on the external surfaces of the both sides of the clip member 6a bite into the retaining lips 510 whereby the clip member 6a is strongly fixed. The mounting position of the clip member 6a in the inner weatherstrip 5A is set at such a position that corresponds to the cutout 6b in the upper edge of the door inner panel 2A when the rear terminal ends of the seal lips 52, 53 of the inner weatherstrip 5A are brought into abutment with the vertical portion 4B of the glass run 4 with no gap being produced therebetween. Since the clip member 6a is intended to register only the rear end of the inner weatherstrip 5A, the clip 6a is specified at a position which is a predetermined distance away from the rear terminal end of the inner weatherstrip 5A irrespective of scattering of the length of the inner weatherstrip 5A or of the longitudinal space between the vertical portions of the glass run 4.

The inner weatherstrip 5A is first positioned by allowing the partition wall 62 of the clip member 6a mounted therein to fit in the cutout 6b in the upper edge of the door inner panel 2A and is then mounted on the door inner panel 2A by allowing the upper edge of the door inner panel 2A to press fit into the mounting base portion 51. The rear terminal ends of the seal lips 52, 53 of the inner weatherstrip 5A so mounted as to come into abutment against the rear vertical portion of the glass run 4 with no gap being formed therebetween, and as this occurs, a slight gap exists between the front terminal ends of the seal lips 52, 53 and the front vertical portion of the glass run 4.

Exterior nose penetrating into the door main body 2 while the vehicle is running then penetrates into the passenger compartment only through the gap at the front terminal end of the inner weatherstrip 5A. However, since the gap at the front terminal end is located away from the ear of the occupant, the inconsonant feeling given by the noise to the ear of the occupant is reduced remarkably lower than when noise enters from a gap that would otherwise be produced at the rear terminal end of the inner weatherstrip 5A. Consequently, with the inner weatherstrip 5A, noise, which is inconsonant to the ear of the occupant, can be reduced by disposing the inner weatherstrip 5A such that the gap between the terminal end and the glass run 4 is produced only at the front terminal end.

According to the structure of this embodiment, while the positioning means for the inner weatherstrip 5A is constituted by the cutout 6b formed on the door inner panel 2A side and the clip member 6a provided on the inner weatherstrip 5A side, another structure may be adopted. For example, the end portion of the inner weatherstrip 5A is formed and a terminal end thereof is connected by molding to a terminal end of a weatherstrip formed by extrusion. In this case, a partition wall corresponding to the partition wall 62 of the clip member 6a is formed in the mounting base portion in the molded terminal end portion, and this partition wall may be constructed to fit in the cutout formed in the upper edge of the door inner panel.

Figure 2A:
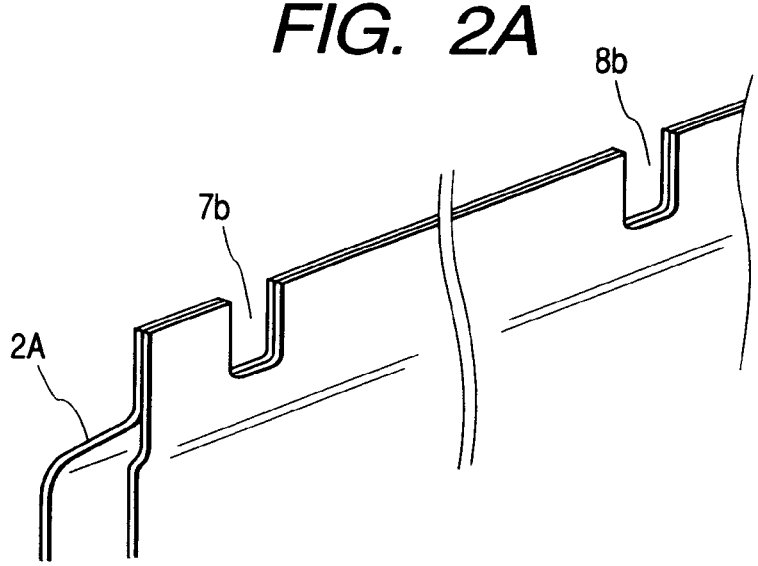
FIG. 2A shows first and second positioning means (cutouts) of a second embodiment, formed in an upper edge of a door inner panel.
Figure 2B:
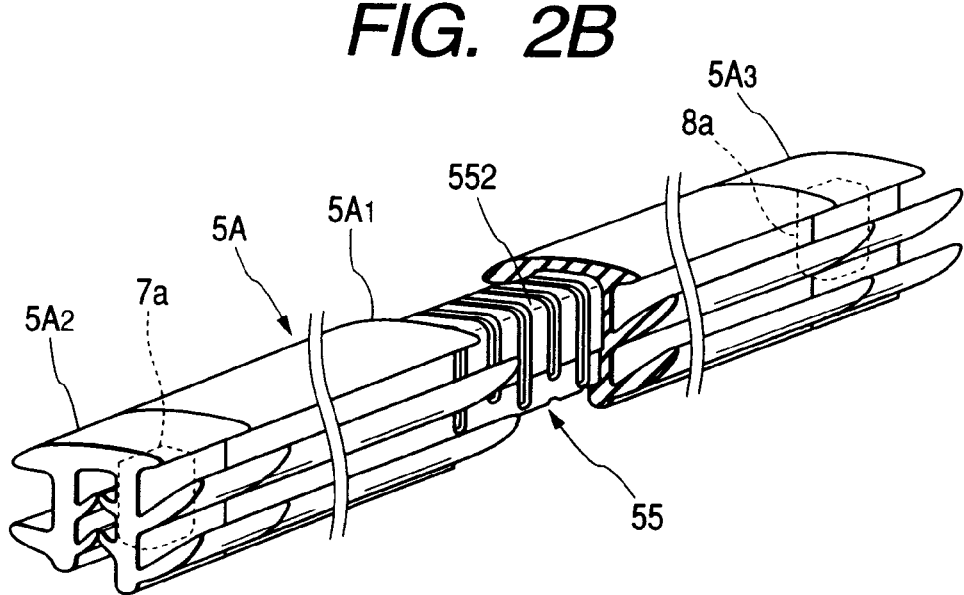
FIG. 2B is a perspective view of a door window glass inner weatherstrip in which first and second positioning means (partition walls) are provided.
Figure 2C:
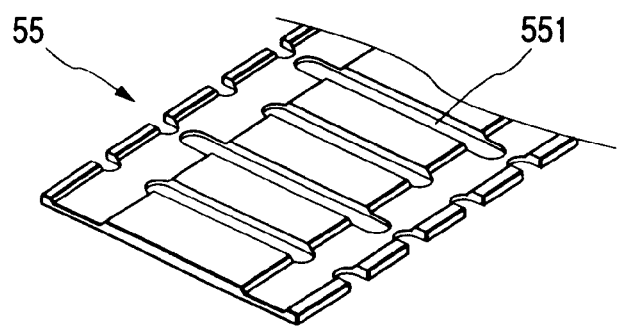
FIG. 2C is an exploded view of a core member that is to be embedded in the door window glass inner weatherstrip.

FIGS. 2A, 2B and 2C show another embodiment in which positioning means are provided at front and rear positions of the inner weatherstrip 5A.

As shown in FIG. 2A, cutouts 7b, 8b are formed in an upper edge of the door inner panel 2A at front and rear end portions. On the other hand, as shown in FIG. 2B, the inner weather strip 5A comprises an extruded member 5A1 and molded terminal end members 5A2, 5A3 which are connected to front and rear ends of the extruded member 5A1 by molding. The cross-sectional shape of the extruded member 5A1 is the same as the inner weatherstrip 5A described in the previous embodiment. A core member 55 is embedded in the extruded member 5A1. FIG. 2C is an exploded view of the core member. The core member 55 is a belt-like metal plate and a number of slots 551 which extend transversely are formed in a longitudinal direction at small intervals, and the slots 551 are extended every other slot. When the extruded member 5A1 having the core member 55 embedded therein is flexed in a thickness direction, the core member 55 fails at ends of the extended slots 551, whereby a number of core pieces 552 are separated from each other. Partition walls 7a, 8a are formed in the molded terminal members 5A2, 5A3 in such a manner as to partition longitudinally the respective mounting base portions 51.

The positions of the partition wall 7a and the cutout 7b constituting a first positioning means are set at such positions that a front terminal end of the molded terminal portion 5A2 comes into abutment against the front vertical portion of the glass run when the partition wall and the cutout are brought into engagement with each other, and the positions of the partition wall 8a and the cutout 8b constituting a second positioning means are set at such positions that a rear terminal end of the molded terminal portion 5A3 comes into abutment against the rear vertical portion of the glass run when the partition wall and the cutout are brought into engagement with each other.

The inner weatherstrip 5A is mounted on the door inner panel 2A by allowing the first positioning means 7a, 7b, and the second positioning means 8a, 8b to be brought into engagement with each other, respectively. In this case, as previously mentioned, the length of the inner weatherstrip 5A is made slightly shorter than the longitudinal space between the front and rear vertical portions 4A, 4B of the glass run 4, therefore the length between the front and rear partition walls 7a, 8a is shorter than the longitudinal space between the front and rear cutouts 7b, 8b in the door inner panel 2A. However, since the core member 55 is divided into pieces within the inner weatherstrip 5A and the extruded member 5A1 of the inner weatherstrip 5A can extend and contract for adjustment, the constituent components of the respective front and rear positioning means can engage with each other respectively by slightly extending the extruded member 5A1.

Thus, according to this embodiment of the present invention, both the front and rear terminal ends of the inner weatherstrip 5A come to abutment against the front and rear vertical portions 4A, 4B of the glass run 4, respectively, and there exist substantially no gaps, whereby the penetration of noise into the passenger compartment through the door main body is prevented.

Figure 5A:
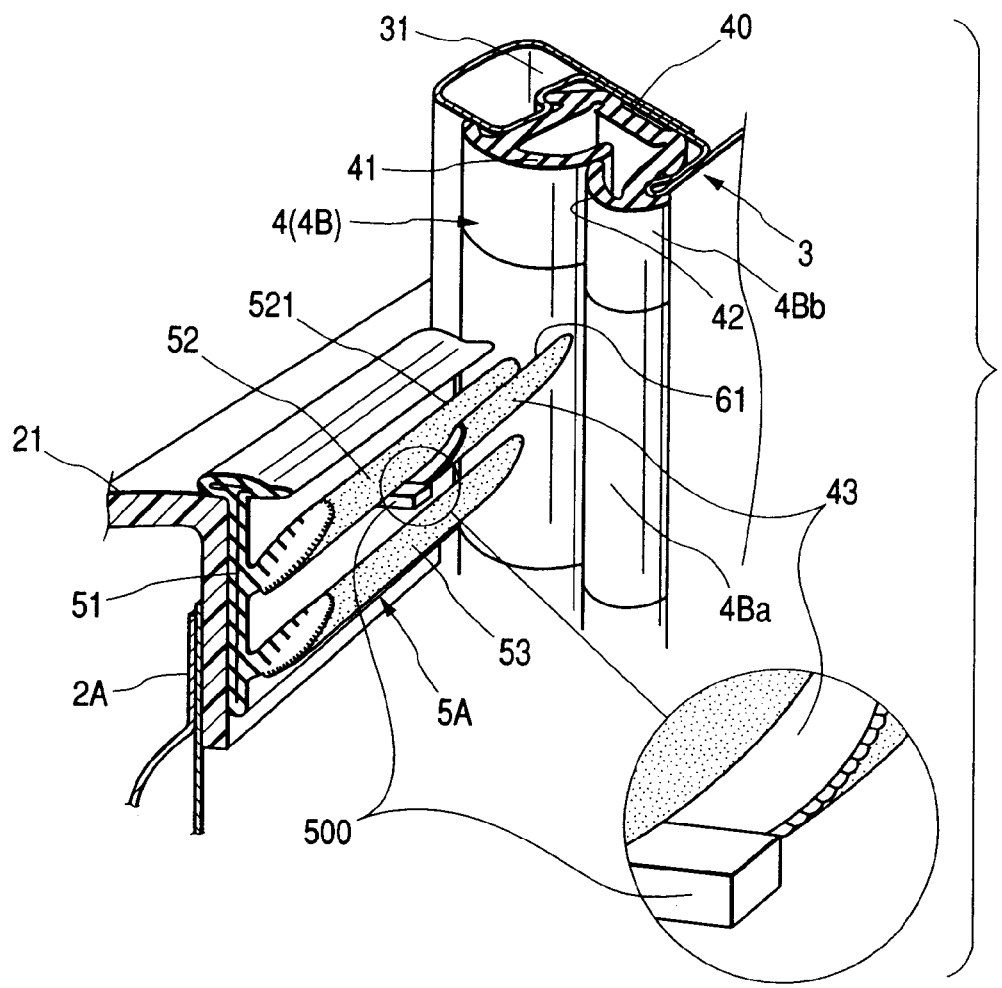
FIG. 5A is a perspective view of a rear portion of a door window glass inner weatherstrip of a third embodiment of the present invention.
Figure 5B:
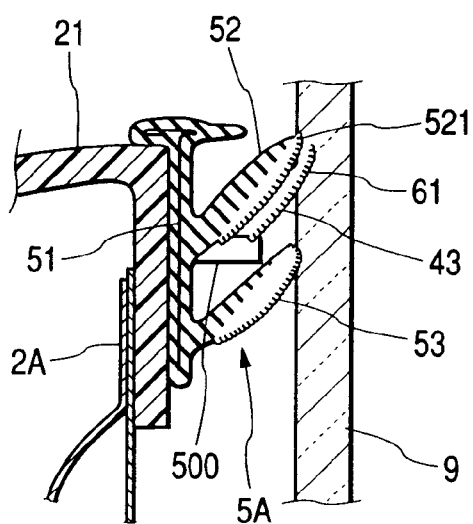
FIG. 5B is a sectional view of a door window glass inner weatherstrip of the third embodiment of the present invention.

The third embodiment of the invention will be described, referring mainly to a portion shown in FIGS. 5A and 5B where a rear terminal end of a door window glass inner weatherstrip 5A and a glass run 4 attach to each other.

According to the structure of the door window glass weatherstrip 5 mounted on the belt line 20 of the door main body 2, the inner weatherstrip 5A is mounted on an upper edge of the door inner panel 2A with an interior trim 21, and a door window glass outer weatherstrip is mounted on an upper edge of a door outer panel. The inner weatherstrip 5A comprises upper and lower seal slips 52, 53 which extend diagonally upwardly toward an inner surface of the door window glass 9 from a flat-plate like base portion 51 having an insert embedded therein. Flocking piles are provided on lower surfaces or glass abutment surfaces which abut against the surface of a door window glass of the respective seal lips 52, 53. Further, a positioning projection 500 projecting toward a door window glass side is formed at a rear terminal end portion of the inner weatherstrip 5A between the seal lips 52, 53 on a position which is at a predetermined distance away from the rear terminal end.

The inner weatherstrip 5A in this embodiment can be formed in such a manner that an end portion of the weatherstrip 5A having the positioning projection 500 is formed by molding and a terminal end thereof is connected by molding to a terminal end of a weatherstrip formed by extrusion. In addition, a terminal end of the inner weatherstrip 5A is formed by molding or cutting so as to have a surface matching to exterior shape of the glass run 4, allowing the inner weatherstrip 5A to be brought into abutment with the glass run 4 without forming gap.

Although the base portion 51 of the inner weatherstrip 5A in this embodiment is constituted by the flat-plate like base portion 51, U-shape mounting base portions as described in the first and second embodiments can be also applied for providing such the positioning projecting 500 thereon.

Figure 4:
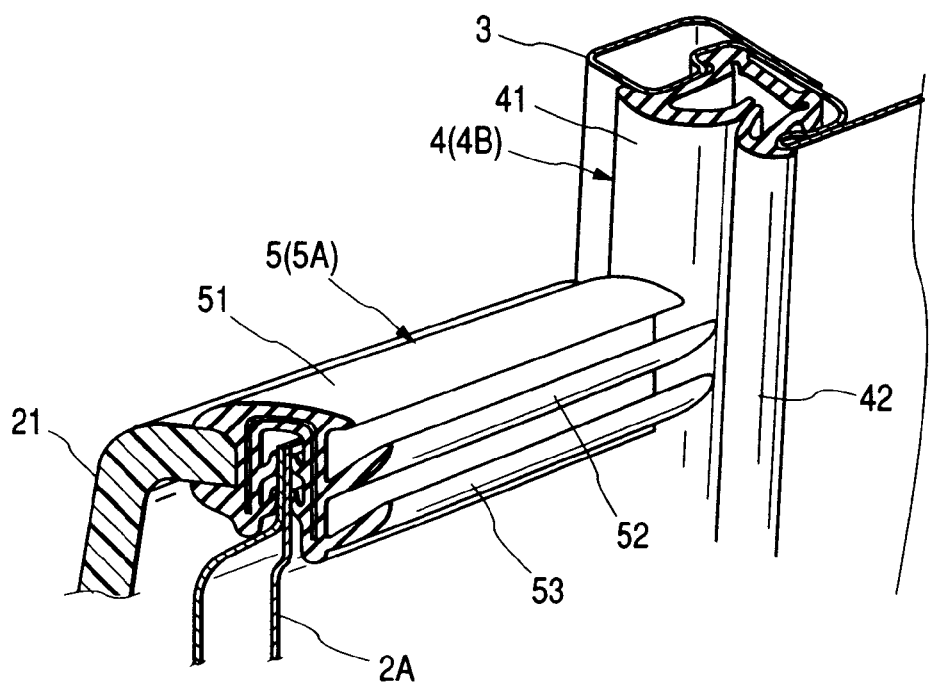
FIG. 4 is a perspective view of a portion where the door window glass inner weatherstrip attaches to the glass run.

The glass run 4 in this embodiment comprises an extruded portion 4Bb and a molded connecting portion 4Ba. The basic structure of the extruded portion 4Bb in this embodiment is substantially the same as the glass run 4 of the first and second embodiment as shown in FIG. 4. That is, the extruded portion 4Bb comprises an inner seal lip 41 and an outer seal lip 42, having a substantially U-shaped cross section toward each other. The extruded portion 4Bb securely fits in a channel portion 31 of the window frame 3 and is connected to the molded connecting portion 4Ba at a terminal end thereof by molding.

The molded connecting portion 4Ba is formed by molding. A noise insulating lip 43 is molded integrally on the molded connecting portion 4Ba of the glass run 4. Namely, the noise insulating lip 43 extends in a lip shape from a glass abutment surface of the inner seal lip 41 of the molded connecting portion 4Ba in such a manner as to overlap a lower side of the upper seal lip 52 of the inner weatherstrip 5A.

Then, an end face of the noise insulating lip 43 abuts against a side of the projection 500 on the inner weatherstrip 5A so that the positioning of the noise insulating lip 43 is effected. In this state, the interior trim 21 is mounted on the door inner panel 2A. Of course, in this state, terminal ends of the respective seal lips 52, 53 of the inner weatherstrip 5A are in abutment with the inner seal lip 41 in the molded connecting portion 4Ba of the glass run 4, this eliminates any risk that there is produced a gap between the inner seal lip 41 and the respective terminal ends of the seal lips 52, 53. Furthermore, should the abutment of the leading ends of the seal lips 52, 53 with the inner seal lip 41 disengage, thereby causing a slight gap therebetween, the noise insulating lip 43 exists between the inner seal lip 41 and the seal lips 52, 53, whereby the penetration of noise into the passenger compartment through the gap can be prevented.

In addition, there may exist a slight gap between the noise insulating lip 43 and the seal lip 52. In short, there only has to be provided a structure in which the noise insulating lip 43 is interposed between the inner weatherstrip 5A and the inner seal lip 41 of the glass run 4.

According to the present invention, the gap between the rear terminal end of the door window glass inner weatherstrip and the rear vertical portion of the glass run is closed, whereby the inconsonant feeling can be reduced which is given to the occupant by the noise penetrating into the passenger compartment through the space of the door main body. Moreover, by closing a gap between the front terminal end of the door window glass inner weatherstrip and the front vertical portion of the glass run, as well as the gap at the rear terminal end, the penetration of noise into the passenger compartment through the inside of the door main body is prevented, whereby the riding comfort for the occupant can be further improved.

What is claimed is:

1. A mounting structure of a weatherstrip on a vehicle door, comprising:

an inner door panel provided in said vehicle door;

a door window glass inner weatherstrip provided along an upper edge of said inner door panel, having a mounting base portion and a seal lip in resilient contact with a door window glass;

a glass run provided on said vehicle door; and a positioning means provided in said door window glass inner weatherstrip and said upper edge of said door inner panel;

wherein said positioning means includes at least two components that are brought into engagement with each other to thereby allow said window glass inner weatherstrip to be securely positioned at such a position that a rear terminal end of said door window glass inner weatherstrip is brought into abutment with a rear vertical portion of said glass run.

2. A mounting structure of a weatherstrip on a vehicle door according to claim 1, said at least two components of said positioning means comprising, a positioning projection provided on said door window glass inner weatherstrip at a predetermined distance away from said rear terminal end of said door window glass inner weatherstrip, and a noise insulating lip integrally formed on said glass, wherein said positioning projection and said noise insulating lip are brought into abutment with each other.

3. A mounting structure of a weatherstrip on a vehicle door according to claim 1, wherein said rear terminal end of said door window glass inner weatherstrip has a surface matching to an exterior shape of said glass run, allowing said door window glass run, allowing said door window glass inner weatherstrip to be brought into abutment with said glass run without forming gap.

4. A mounting structure of a weatherstrip on a vehicle door according to claim 1, said at least two components of said positioning means comprising, a cutout in said inner door panel at a predetermined distance away from said rear terminal end of said door window glass inner weatherstrip, and a clip mounted in said door window glass inner weatherstrip at a rear end portion of said mounting base portion, wherein said clip and said cutout are brought into abutment with each other.

5. A mounting structure of a weatherstrip on a vehicle door, comprising:

an inner door panel provided in said vehicle door;

a door window glass inner weatherstrip provided along an upper edge of said inner door panel, having a mounting base portion resiliently extendable and contractible and seal lip in resilient contact with a door window glass;

a glass run provided on said vehicle door; and at least two positioning means provided in said door window glass inner weatherstrip and said upper edge of said door inner panel;

wherein each said positioning means includes at least two components that are brought into engagement with each other respectively, whereby a front terminal end of said door window glass inner weatherstrip is securely positioned to be brought into abutment with a front vertical portion of said glass run and a rear terminal end of said door window glass inner weatherstrip is positioned to be brought into abutment with a rear vertical portion of said glass run.

6. A mounting structure of a weatherstrip on a vehicle door according to claim 5, said at least two components of said positioning means comprising, a positioning projection provided on said door window glass inner weatherstrip at a predetermined distance away from said rear terminal end of said door window glass inner weatherstrip, and a noise insulating lip integrally formed on said glass run, wherein said positioning projection and said noise insulating lip are brought into abutment with each other.

7. A mounting structure of a weatherstrip on a vehicle door according to claim 5, wherein said rear terminal end of said door window glass inner weatherstrip has a surface matching to an exterior shape of said glass run, allowing said door window glass inner weatherstrip to be brought into abutment with said glass run without forming a gap.

8. A mounting structure of a weatherstrip on a vehicle door according to claim 5, said at least two components of said positioning means comprising, a cutout in said inner door panel at a predetermined distance away from said rear terminal end of said door window glass inner weatherstrip, and a clip mounted in said door window glass inner weatherstrip at a rear end portion of said mounting base portion, wherein said clip and said cutout are brought into abutment with each other.

* * * * *